United States Patent [19]

Hoppe et al.

[11] 4,333,894
[45] Jun. 8, 1982

[54] MASS-TRANSFER COLUMN

[75] Inventors: Klaus Hoppe, Magdeburg; Jürgen Müller; Jürgen Keller, both of Karl-Marx-Stadt; Bernd Kulbe, Leipzig; Klaus Lessig, Grimma; Christian Berlin, Grimma; Eckhard Danke, Grimma, all of German Democratic Rep.

[73] Assignee: Veb Chemieanlagenbaukombinat Leipzig-Grimma, Grimma, German Democratic Rep.

[21] Appl. No.: 110,853

[22] Filed: Jan. 10, 1980

[51] Int. Cl.³ ................................................ B01F 3/04
[52] U.S. Cl. ...................................... 261/96; 261/97; 261/DIG. 72
[58] Field of Search ................................ 261/94–98, 261/112, DIG. 72; 55/488; 202/158

[56] References Cited

U.S. PATENT DOCUMENTS

| 1,734,125 | 11/1929 | Greene | 55/488 |
| 2,243,323 | 5/1941 | Walton et al. | 55/488 |
| 2,271,671 | 2/1942 | Wible | 261/96 X |
| 3,785,620 | 1/1974 | Huber | 261/DIG. 72 |
| 3,796,657 | 3/1974 | Pretorius et al. | 261/DIG. 72 |
| 3,922,152 | 11/1975 | Kookoothakis | 55/488 X |
| 3,959,419 | 5/1976 | Kitterman | 261/112 X |
| 4,002,705 | 1/1977 | McKeown | 261/98 |

Primary Examiner—Richard L. Chiesa
Attorney, Agent, or Firm—Michael J. Striker

[57] ABSTRACT

A mass-transfer column consisting of one or more contact zones. The contact zones are exclusively provided with packings placed in prearranged locations. In the contact zones, optimal operating conditions for the packings are created over the entire height of the contact zones in order to achieve a minimal pressure loss at a concomitant high separating efficiency. This is done by implementing a suitable gradated adaptability of the packing to the vapor and liquid loads varying over the height of the contact zones.

3 Claims, 2 Drawing Figures

MASS-TRANSFER COLUMN

BACKGROUND OF THE INVENTION

The invention relates to a mass-transfer column consisting of one or a plurality of contact zone(s). The contact zones are exclusively provided with packings placed in prearranged locations. Such columns are preferably used in chemical process technology in which the vapor load over the height of one contact zone is subject to a wider but continual rate of change. As per U.S. Pat. No. 3,959,419, a liquid-vapor contact process with appurtenant apparatus in the form of a column has become known. The device is characterized in essence by consisting of one or a plurality of contact zone(s), wherein each of the latter is provided with a plurality of grid beds and an immediately contiguous random bulk packing. This solution, as known, is of the disadvantage that the combination of random packings with packings at prearranged locations brings about mass-transfer elements of different operating characteristics. As a consequence thereof, the operating characteristic of the column for both types of packings cannot be optimally ensured throughout the load range demanded from production-scale columns. The different packings will, for instance, show characteristics of separating efficiency divergent from each other depending upon the liquid and vapor loads.

The combination of packings of different structure and function will have a negative effect also regarding the liquid distribution, i.e. the liquid distribution characteristics of the upper packing will determine the liquid distribution profile of the respective packing located below, but this will not be optimal for the latter. The relatively coarse structure of the packing has the disadvantage that packing elements of the layer above will penetrate the coarse packing structure. This disadvantage is increasingly present in mass-transfer columns subjected to surge loads and under the influence of vibration. Penetration of packing elements into the packing will lead to uncontrolled reduction of the interstitial volume in that zone. As a consequence thereof, the pressure loss will rise and, at strongly reduced interstitial volumes, localized tortuous flow will occur in the contact zones.

SUMMARY OF THE INVENTION

It is the object of the invention, to create a mass-transfer column subdivided into one or a plurality of contact zone(s), in which optimal operating conditions for the packing are created over the entire height of the contact zone(s), in order to achieve a minimal pressure loss at a concomitant high separating efficiency.

The invention is based on the task of implementing a suitably gradated adaptability of the packing to the vapor and liquid loads varying over the height of a contact zone, of avoiding localized tortuous flow, and of achieving the necessary uniform distribution of the liquid within every contact zone.

This is achieved in essence by the entire packing or contact zone consisting of a plurality, however a minimum of three, of immediately contiguous packings of varying geometry, but identical basic structural configuration.

The geometrical dimensions of the configuration influencing the load-sustaining capacity are, depending upon the vapor and liquid loads, gradated in such a manner that the free-flow sectional area is adapted to these loads and that every packing will operate within the optimal load range.

A particular embodiment of the invention provides for the packings immediately contiguous within one contact zone being offset at right angles relative to each other. A further characteristic of the invention consists in the packings in the upper region of every contact zone being of such construction and arrangement in the region of the column shell that they will allow achieving uniform liquid profile for the contiguous packings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The invention is described in more detail below, with the use of an embodiment. The embodiment relates to a grid packing for columns as known. The relevant drawings show.

DESCRIPTION OF THE PREFERRED EMBODIMENTS

Figure 1:
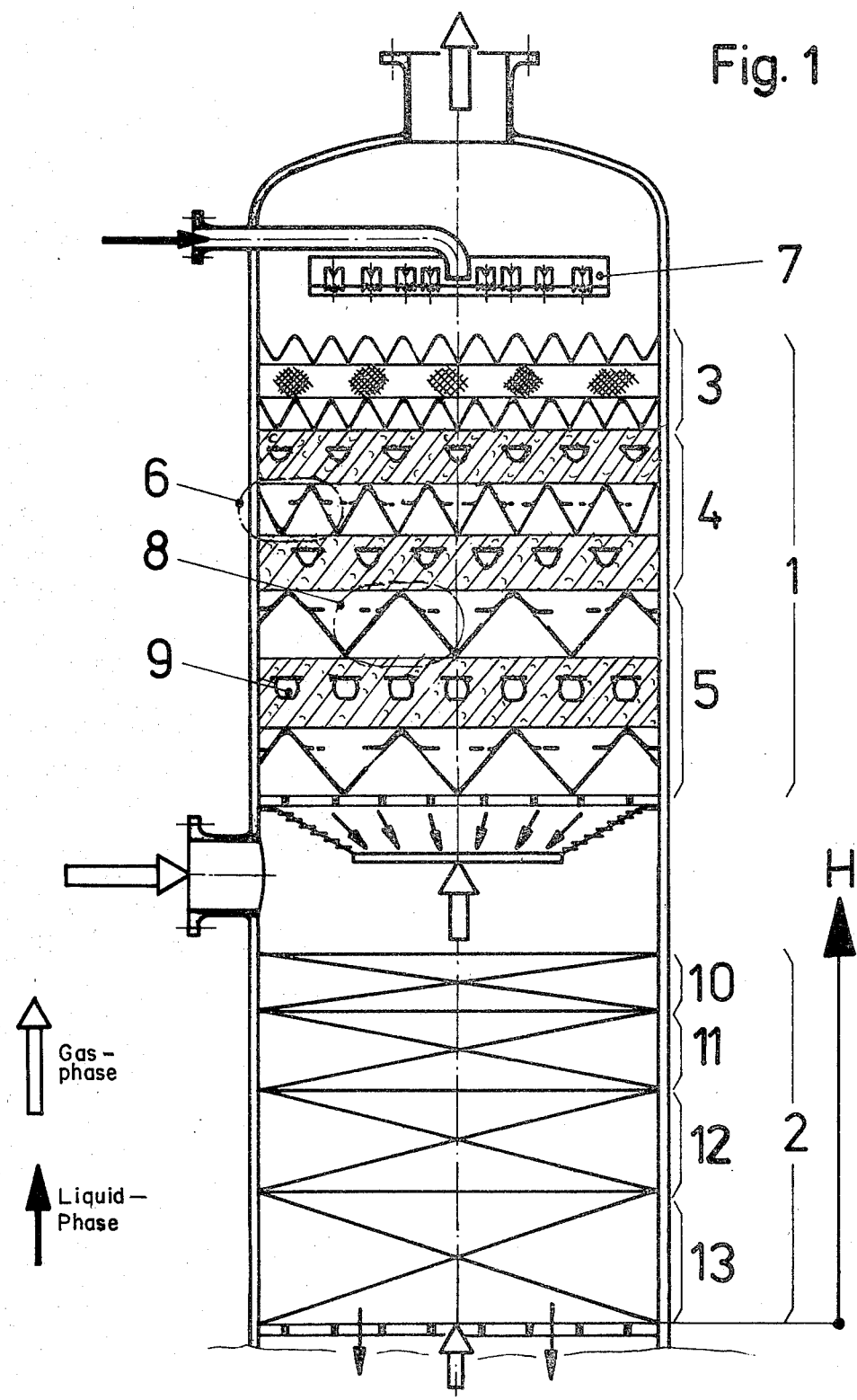
FIG. 1: Partial section through a mass-transfer column, with representation of two contact zones.
Figure 2:
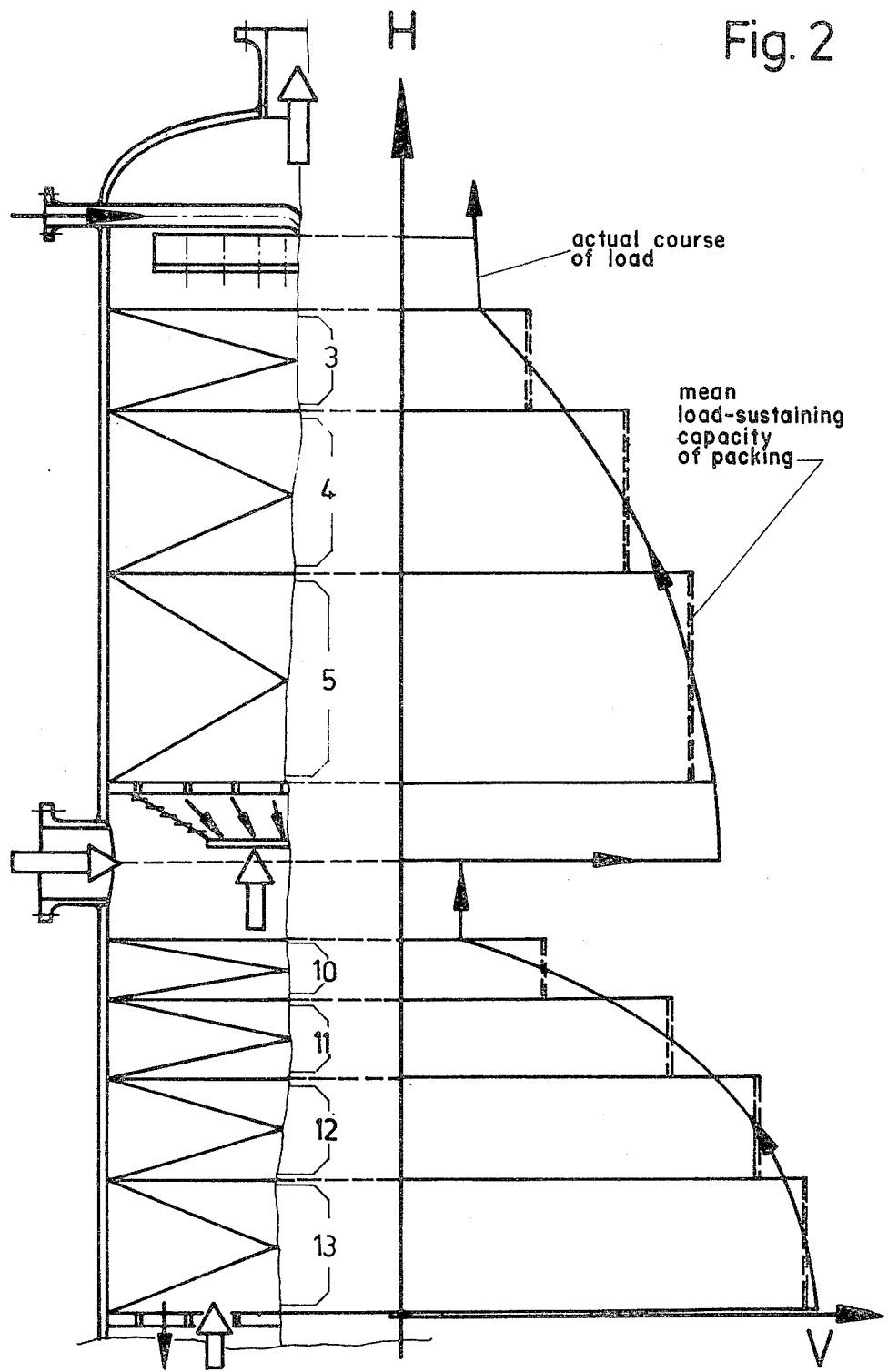
FIG. 2: Graphic representation of the load characteristics across the two contact zones shown in FIG. 1, and the load gradation of packings as per FIG. 1.

The mass-transfer column as per invention, consists of a plurality of contact zones, of which contact zones 1 and 2 are represented in FIG. 1. Corresponding to the characteristic of the load over the height of the contact zone shown in FIG. 2, the contact zone consists of three packings 3, 4 and 5. These packings 3, 4, 5 are of identical basic configuration, but differing geometry. As can be seen from the characteristics of the load over the height of the contact zone 1, as shown in FIG. 2, the load will continuously decrease in the direction of the ascending vapor flow. To conform to this characteristic of the load, the lowest packing 5 will have the largest free-flow sectional area. The packing 4 located above is of a smaller sectional area relative to the packing 5. This reduction from packing to packing continues in the direction of the ascending vapor flow, i.e. the free-flow sectional area will decrease with a decreasing vapor volume. This reduction of the free-flow sectional area from packing to packing is implemented by varying the width and height of the individual elements of the packings, the size and number of additional gas passages, the use of perforated basic material with varying opening ratios and different material thickness, as well as by varying the directions of the arrangement of the passages in the base material of the individual elements 8.

In the contact zone 1 shown in FIG. 1, reduction of the free-flow sectional area from packing to packing is implemented by varying the width and height of individual elements as well by the size and number of the additional gas passage 9. The contact zone 2 of FIG. 1 has, contrary to the contact zone 1, four packings 10, 11, 12, 13. These four packings are required, in order to ensure a good adaption of the load characteristics over the height of the contact zone 2 relative to the load characteristic shown in FIG. 2 for the contact zone 2.

This is to prove that the number of packings within one contact zone is determined by the load difference between inlet and outlet of a contact zone, and by the load characteristics over the height of the respective contact zone.

The peripheral elements 6 of packings 3 and 4 are of such configuration that the liquid is conducted from the region of the column shell in the direction of the column center, in order to obtain a uniform liquid distribution over the height of the entire contact zone and across the column area. The outer flanks of the peripheral elements 6 are herein oriented inclined up towards the column shell and do not have additional passages 9.

Attainment of this objective is furthermore aided by adapting the spray head 7 to the inherent distributive properties for the liquids, particularly of the packings 3 and 4. This adaption for instance, is achieved by a concentration of distributing points in the region of the column center. The packings 3, 4 and 5 are arranged offset at right angles to each other. This will avoid the individual elements of the packings penetrating each other where they abut. The offset of the packings and their contact only at points of abutment is of advantage for the process technology since the numerous separating edges will bring about a redistribution of liquid and regeneration of the contact surfaces.

The solution as per invention, may also be used for process technology wherein, contrary to the embodiment described herein, the flow rate of the vapor in the direction of the vapor flow will increase on passing a contact zone. The free-flow sectional area of a packing will herein increase corresponding to the increase of the ascending vapor flow, i.e. the packing located lower will have a smaller free-flow sectional area than the packing above it.

The decisive advantage of the invention in respect of technology and economics consists in achieving a reduction of the required column diameter, a reduction of the respective packing height required in every contact zone for the implementation of the objective of separation, and a lowering of the pressure loss required for the implementation of the entire process.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Mass-transfer column for liquid-vapor contact processes, provided with packed tower internals and consisting of one or a plurality of a contact zone(s), wherein every contact zone is subdivided into immediately contiguous packed tower internals, characterized by the entire packed tower internals of one contact zone (1) containing a plurality, but a minimum of, three immediately contiguous horizontal packings (3; 4; 5) of varying geometry but identical basic structural configuration, said varying geometry having influence upon the vapor and liquid loading capacity of such a gradation that the free-flow sectional area is adapted to the load, thereby operating in the optimal load range of each of said packings.

2. Mass-transfer column according to claim 1, wherein said immediately contiguous packings are arranged offset at right angles to each other.

3. Mass-transfer column according to claim 1, wherein the packings in the upper region of every contact zone are so designed and arranged that a uniform liquid profile for the contiguous packings is achieved.

* * * * *